(12) United States Patent
Roy et al.

(10) Patent No.: US 7,555,515 B1
(45) Date of Patent: Jun. 30, 2009

(54) ASYNCHRONOUS PIPELINE

(75) Inventors: Paul J. Roy, Menlo Park, CA (US);
Andrew J. Jaffray, San Francisco, CA (US); Pradeep K. Jha, Fremont, CA (US); Victor S. Lee, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 849 days.

(21) Appl. No.: 10/420,134

(22) Filed: Apr. 21, 2003

(51) Int. Cl.
*G06F 13/00* (2006.01)
(52) U.S. Cl. .................. 709/201; 718/106; 370/235
(58) Field of Classification Search .............. 709/201; 718/106; 370/235
See application file for complete search history.

(56) References Cited

U.S. PATENT DOCUMENTS

| | | | |
|---|---|---|---|
| 6,535,518 B1 * | 3/2003 | Hu et al. | 370/401 |
| 6,813,243 B1 * | 11/2004 | Epps et al. | 370/235 |
| 7,404,172 B2 * | 7/2008 | Wong et al. | 716/18 |
| 7,424,493 B2 * | 9/2008 | Gupta | 707/201 |
| 2004/0158802 A1 * | 8/2004 | Wong et al. | 716/3 |

* cited by examiner

*Primary Examiner*—Kenneth R Coulter

(57) ABSTRACT

A pipeline may include a first stage and a second stage for executing data processing services and a data host communicatively coupled to the first and second stages. The data host provides for storing and communicating data, wherein the storing and communicating are asynchronous one to another. Execution of the first data processing service is asynchronous with respect to execution of the second data processing service.

13 Claims, 12 Drawing Sheets

ASYNCHRONOUS PIPELINE

TECHNICAL FIELD

The present invention generally relates to the field of data processing in a pipeline, and particularly to an asynchronous pipeline.

BACKGROUND

With the emergence of the Internet and the interconnection of devices utilized in most every aspect of modern life, a wide range of data has become available of an almost limitless diversity. However, because of the sheer volume of data, a user wishing to locate data of a particular type may not be able to interact with the desired data in an optimized manner. Even if a user is able to locate data of interest, locating related data may be difficult. To address these limitations, data may be processed and linked to indicate related data among various sets of data. Therefore, a user interacting with linked data may efficiently locate and access related data.

Internet content may be thought of as data that has intrinsic value to a subset of users of web sites, internet client devices, and the like. This data can be configured to more efficiently address and therefore be of greater value to the subset of users. In many cases, this greater value is created as a result of some type of data processing, typically in the form of a sequence of stages, which may be implemented through use of a pipeline. A pipeline is a workflow process that includes multiple stages, which may provide processing of sets of data, such as combining multiple sets of data into a single set of data through interlinking related data, and the like. Often, an output of a stage of a pipeline will serve as input to multiple subsequent stages, each of which may represent a beginning of a new pipeline and/or a continuation of the same pipeline.

Because of the wide range of data available from the Internet, systems utilizing a large number of pipelines may be utilized to process the data through use of the various stages. In some systems, for example, pipelines are interconnected with other pipelines through interconnected stages, resulting in a large and intricate system of pipelines, such that execution of the pipelines demands a significant amount of computer resources. Execution of pipelines may include executing data processing services included in stages of the pipeline, such as interlinking related data, and the like.

One previous method utilized to address pipeline operation was through a "schedule driven" model. In such an instance, developers made a best guess of time needed for each stage to execute to arrive at an expected execution time. Stages were then operated based on the expected execution time of previous stages. Using a schedule driven model, a stage in a pipeline processed data and transferred the processed data when a subsequent stage was available to process the data. Therefore, the stage was dependent on whether the subsequent stage was available to processed data. Additionally, the schedule driven model is problematic because situations may be encountered which do not conform to the expectations, which may be based on performance assumptions made when constructing a pipeline. Therefore, a pipeline using a schedule driven model requires support systems and provision for manual start of stages for unscheduled instances. Use of a schedule drive model may be software, hardware and user intensive, and therefore consume valuable resources.

Therefore, it would be desirable to provide a system and method for asynchronous pipeline operation.

SUMMARY

Asynchronous pipeline operation is described. To support efficient implementation of pipelines, it is desirable that a given stage in a pipeline be able to operate when the stage's input constraints are met, and without regard as to whether subsequent stages are finished processing data from a previous operation of that stage.

In an implementation, stages of a pipeline operate asynchronously with respect to other stages by maintaining stored data which is output by the stages of the pipeline. This stored data may be maintained in a data host. Therefore, a stage may generate new versions of output data while a subsequent stage consumes, or will consume, a previous version of the data. By providing for storage, the data host provides decoupled operation of consecutive stages and thus allows asynchronous operation of each of the stages communicatively coupled to the data host, one to another. The data host may also be configured so that stages may asynchronously store and communicate data from the data host.

DETAILED DESCRIPTION

Asynchronous pipeline operation is provided so that stages of the pipeline are not dependent on subsequent stages to perform data processing. For instance, a pipeline may include a first stage and a second stage which are both communicatively coupled to a data host. In this implementation, data output by the first stage is provided as an input to the second stage through use of the data host. The first stage may process a next available set of data without waiting to transfer processed data to the second stage by storing the processed data in the data host. Thus, once input parameters of a stage are met, such as by receiving data for processing, the stage is able to process data.

The data host is configured so that the first stage and the second stage may interact with the data host asynchronously, one to another. For example, data may be stored from the first stage and data may also be communicated to the second stage at the same time. Therefore, the first and second stages may interact with the data host without interfering with each other.

Exemplary Pipeline Implementations

Figure 1:
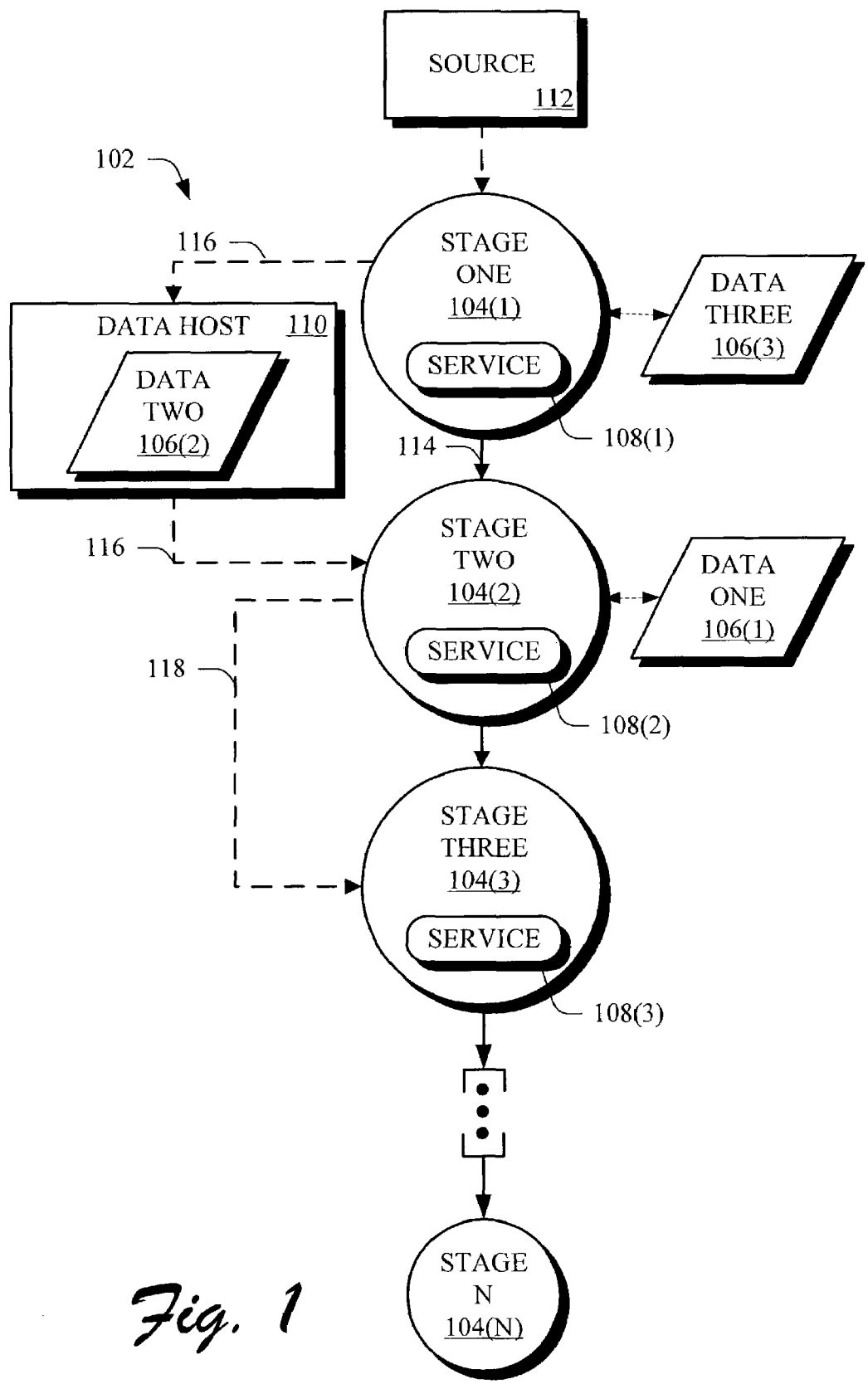
FIG. 1 is an illustration of an exemplary implementation wherein a pipeline processes sets of data using stages.

FIG. 1 is an illustration of an exemplary implementation wherein a pipeline 102 includes a plurality of stages 104(1), 104(2), 104(3), . . . , 104(N) to process sets of data 106(1), 106(2), and 106(3). The stages 104(1)-104(N) execute data processing services 108(1), 108(2), and 108(3), such as manipulation of data, interlinking data, combining data, formatting data, and the like. Executing the data processing services is used to perform the "work" of the stages. The stages 104(1)-104(N) of the pipeline 102 are executed, e.g. executing a data processing service included in the stage, so that successive data processing is provided. For example, a first stage 104(1) executes a first data processing service 108(1) on a first set of data 106(1). The first set of data 106(1) is output to a second stage 104(2) after being processed by the first data processing service 108(1). The second stage 104(2) performs additional data processing by executing a second data processing service 108(2). Likewise, successive data processing may be provided by a third data processing service 108(3) included with a third stage 104(3), through an "Nth" stage 104(N). To ease the following discussion, general references to stages 104(1) through 104(N) will be made as "stage 104" or "stages 104." Additionally, for purposes of the following discussion, processing data by a stage refers to executing a data processing service by a stage.

A data host 110 is included to provide asynchronous operation of the first data processing service 108(1) of the first stage 104(1) with respect to the second data processing service 108(2) of the second stage 104(2). For purposes of brevity in the following discussion, a data processing service will be referred to as a "service." The data host 110 stores data output by the first service 108(1) for subsequent processing by the second service 108(2). By providing storage for output from the first stage 104(1), the data host 110 permits the first service 108(1) to process a next set of data regardless of whether the second service 108(2) is available to process a previous set of data. Thus, asynchronous operation of the first and second services 108(1), 108(2) is provided, one to another.

In the illustrated example shown in FIG. 1, the first stage 104(1) receives a first set of data 106(1) from a source 112 and processes the first set of data 106(1) by executing the first service 108(1). The first set of data 106(1) is then communicated to the second stage 104(2) for further processing by the second data processing service 108(2). While the second service 108(2) processes the first set of data 106(1), the first stage 104(1) obtains a second set of data 106(2). The first service 108(1) then processes the second set of data 106(2). In this example, the first service 108(1) processes the second set of data 106(2) before the second service 108(2) completes processing the first set of data 106(1). Therefore, the second set of data 106(2) is stored in the data host 110, rather than waiting for completion of processing of the first set of data 106(1) by the second service 108(2). Thus, the first stage 104(1) may obtain a third set of data 106(3) for processing by the first service 108(1), independent from the execution of the second service 108(2). In this way, the data host 110 provides for asynchronous execution of the first service 108(1) with respect to execution of the second service 108(2).

The data host 110 may be sized to include one or more sets of data. For instance, it may be desirable to store multiple sets of data in a data host 110 to keep incremental sets of data available (as described in relation to FIG. 6), to free a previous stage that executes at a much greater rate than a subsequent stage from being dependent on whether the subsequent stage is available to process data output by the previous stage, and the like.

Additionally, the size of a data host 110 may be computed to minimize computations needed during processing. Rather than use a scheme where a previous stage explicitly "knows" when a subsequent service is done processing a particular version of data, the data host 110 may be configured based on a maximum amount of time it will take for the subsequent stage to consume data. When combined with determining a fastest possible rate at which the previous stage generates new versions of data, a maximum number of sets of data that should be retained is computed. Further, a scheme may be employed for the data host 110 to delete old versions of data. For example, in an implementation, once a size of the data host 110 has been computed by a developer, an oldest version of data may be safely replaced with a new version, as will be described in relation to FIG. 5.

To provide flow of control information and data through the pipeline 102, each stage 104 of the pipeline 102 may include a control pathway 114, shown as a solid arrow, and data pathways 116, shown as dashed arrows. The control pathway 114 supplies control information between adjacent stages 104 of the pipeline, such as an activation command, version information as will be described in relation to FIG. 6, and the like. The data pathways 116 are used to transmit data, which may include transferring data to and from the data host 110 and an adjacent stage.

In this illustrated example, it should be noted that the data host 110 is not provided between every stage 104 of the pipeline 102, but rather is provided between stages in which a previous stage processes data faster than a subsequent stage. For example, a third stage 104(3), which processes data faster than a previous stage, e.g. the second stage 104(2), may be directly connected to the second stage 104(2) so that a data pathway 118 is provided without using a data host. Such a configuration may be useful to conserve hardware and software resources. However, in additional implementations, data stores may also be provided before and after every stage 104 in the pipeline 102.

Figure 2:
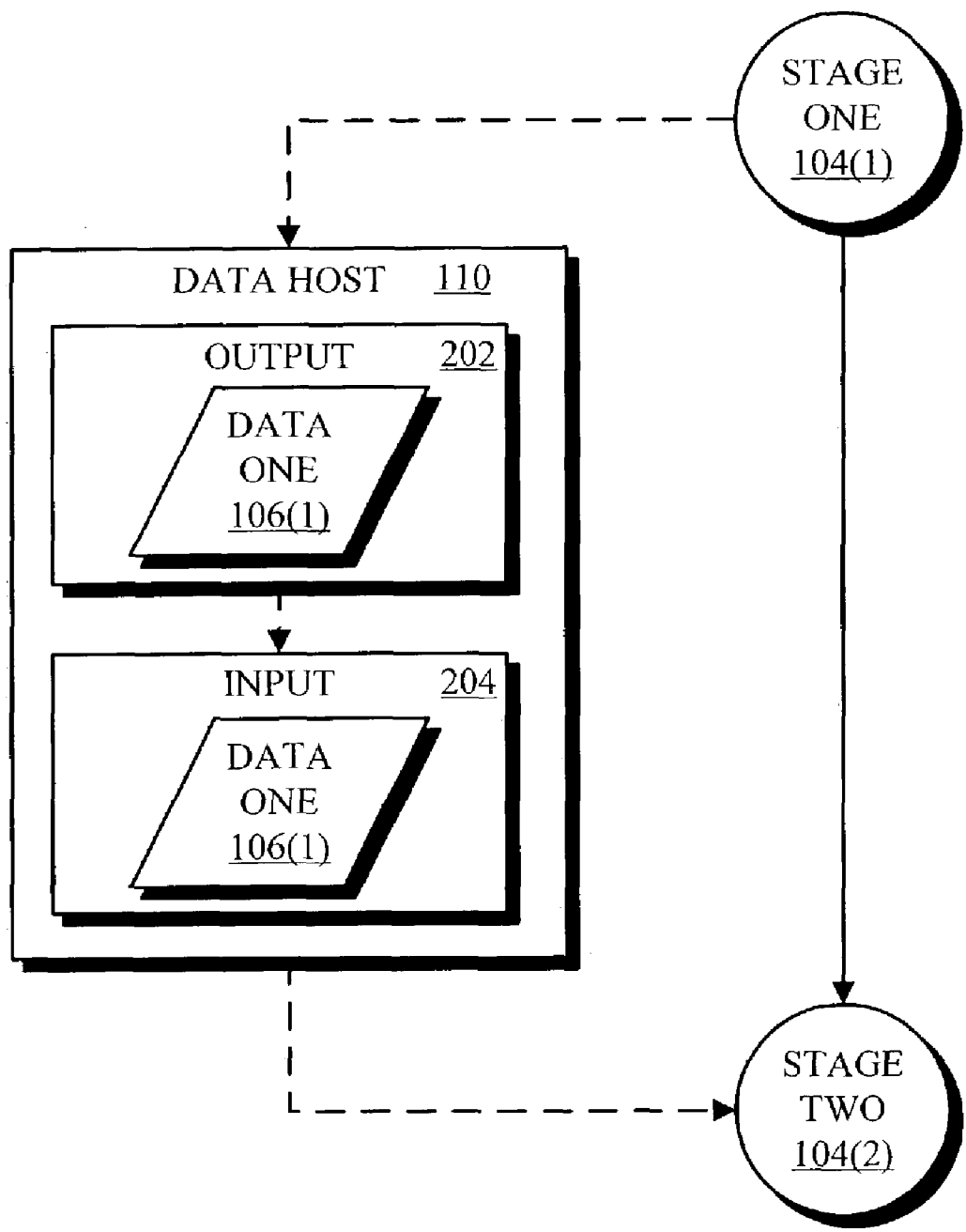
FIG. 2 is an illustration of an exemplary implementation in which data, stored in the data host, is cloned.

FIG. 2 is an illustration of an implementation in which the data host 110 clones data so that at least two stages 104 of the pipeline 102 (FIG. 1) may interact with the data host 110, e.g. store and communicate data, asynchronously. The data host 110 includes an output compartment 202 which receives data output from the first stage 104(1). The data host 110 also includes an input compartment 204 which provides data for communication to the second stage 104(2). The data host 110 may store data, output from the first stage 104(1), in the output compartment 202 while data is communicated to the second stage 104(2) from the input compartment 204 of the data host 110. Thus, the first stage 104(1) and the second stage 104(2) may asynchronously interact with the data host 110, one to another.

The data host 110 clones data from the output compartment 202 to the input compartment 204 so interaction of the first stage 104(1) with the data host 110 does not interfere with interaction of the second stage 104(2) with the data host 110. For example, the first set of data 106(1) is stored in the output compartment 202 after processing by the first stage 104(1). After storing the first set of data 106(1) in the output compartment 202, the data host 110 clones the first set of data 106(1) to the input compartment 204. The cloned first set of data 106(1) is then available for communication from the input compartment 204 to the second stage 104(2). Thus, the first set of data 106(1) may be communicated to the second stage 104(2) from the input compartment 204 without interfering with storing of additional data in the output compartment 202.

Figure 3:
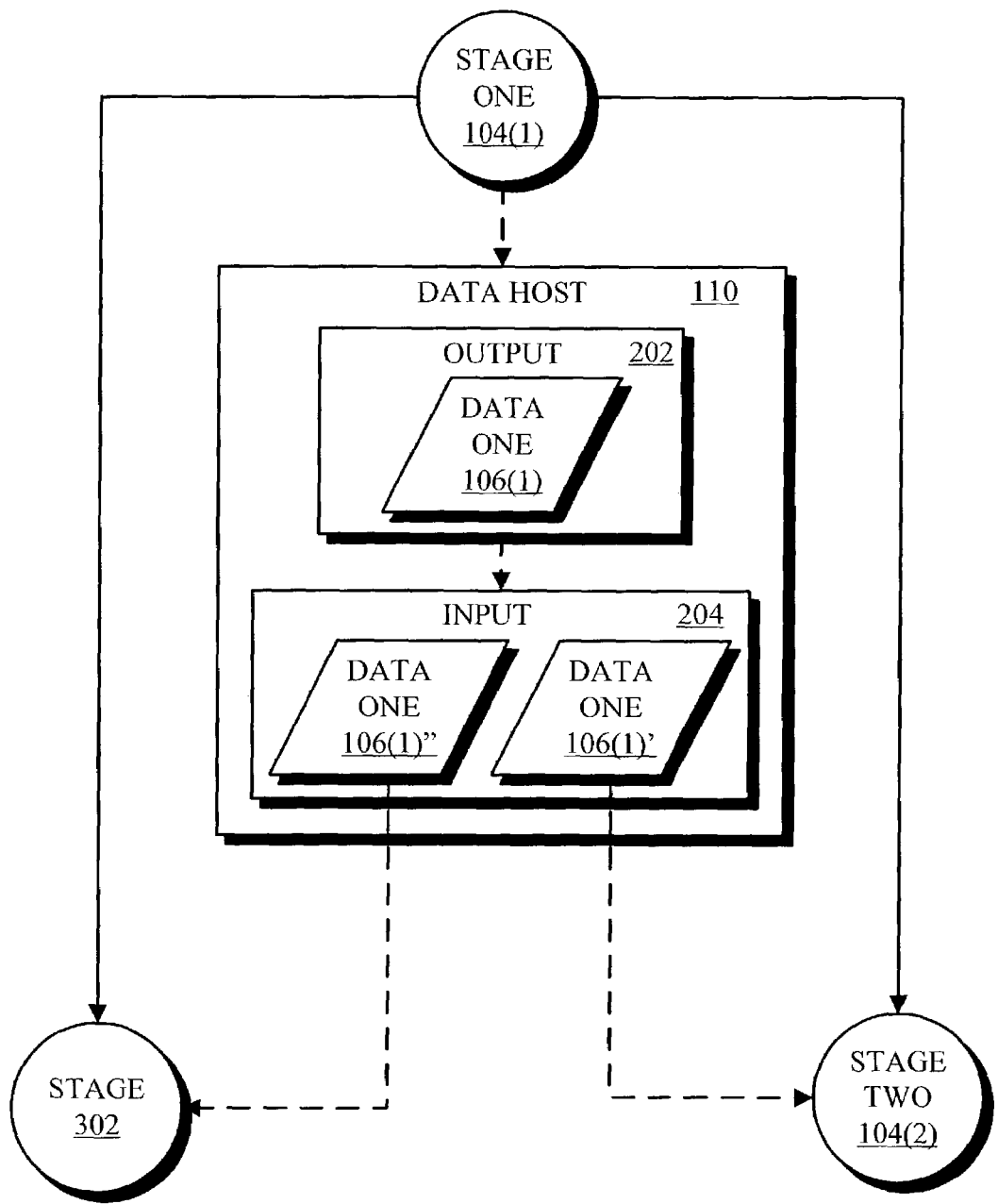
FIG. 3 is an illustration of an exemplary implementation in which the data host clones multiple copies of data for each subsequent stage communicatively coupled to the data host to provide asynchronous operation of subsequent stages.

Cloning sets of data in a data host 110 may also support asynchronous communication of data to multiple subsequent stages. FIG. 3 is an illustration of an implementation of the data host 110 in which the second stage 104(2) and an additional stage 302 obtain the first set of data 106(1) from the data host 110.

The data host 110 may clone a copy of the first set of data 106(1) for each subsequent stage which obtains data from the data host 110 to permit each subsequent stage to asynchronously interact with the data host 110, one to another. For instance, the data host 110 may clone a first copy of the first set of data 106(1)' and a second copy of the first set of data 106(1)'' for the second stage 104(2) and the additional stage 302, respectively. Therefore, the first copy of the first set of data 106(1)' may be communicated to the second stage 104(2) without interfering with communicating the second copy of the first set of data 106(1)'' to the additional stage 302. For example, the first copy of the first set of data 106(1)' may be retrieved from the data host 110 regardless of whether the second copy of the first set of data 106(1) is being retrieved.

Additionally, operation of the first stage 104(1), second stage 104(2) and the additional stage 302 is asynchronous, one to another, with respect to the data host 110. Any one of the stages, e.g. the first, second, or additional stages 104(1), 104(2), and 302, may interact with the data host 110 regardless of whether another one of the stages, e.g. the first, second, or additional stages 104(1), 104(2), and 302, is interacting with the data host 110. For example, data may be stored in the data host 110 regardless of whether data is being communicated to any of the subsequent stages. Thus, in an implementation, any two stages communicatively coupled to the data host may interact with the data host asynchronously, e.g. independent of the interaction of another stage. Although two subsequent stages have been described, a wide number of subsequent stages may be utilized.

Figure 4:
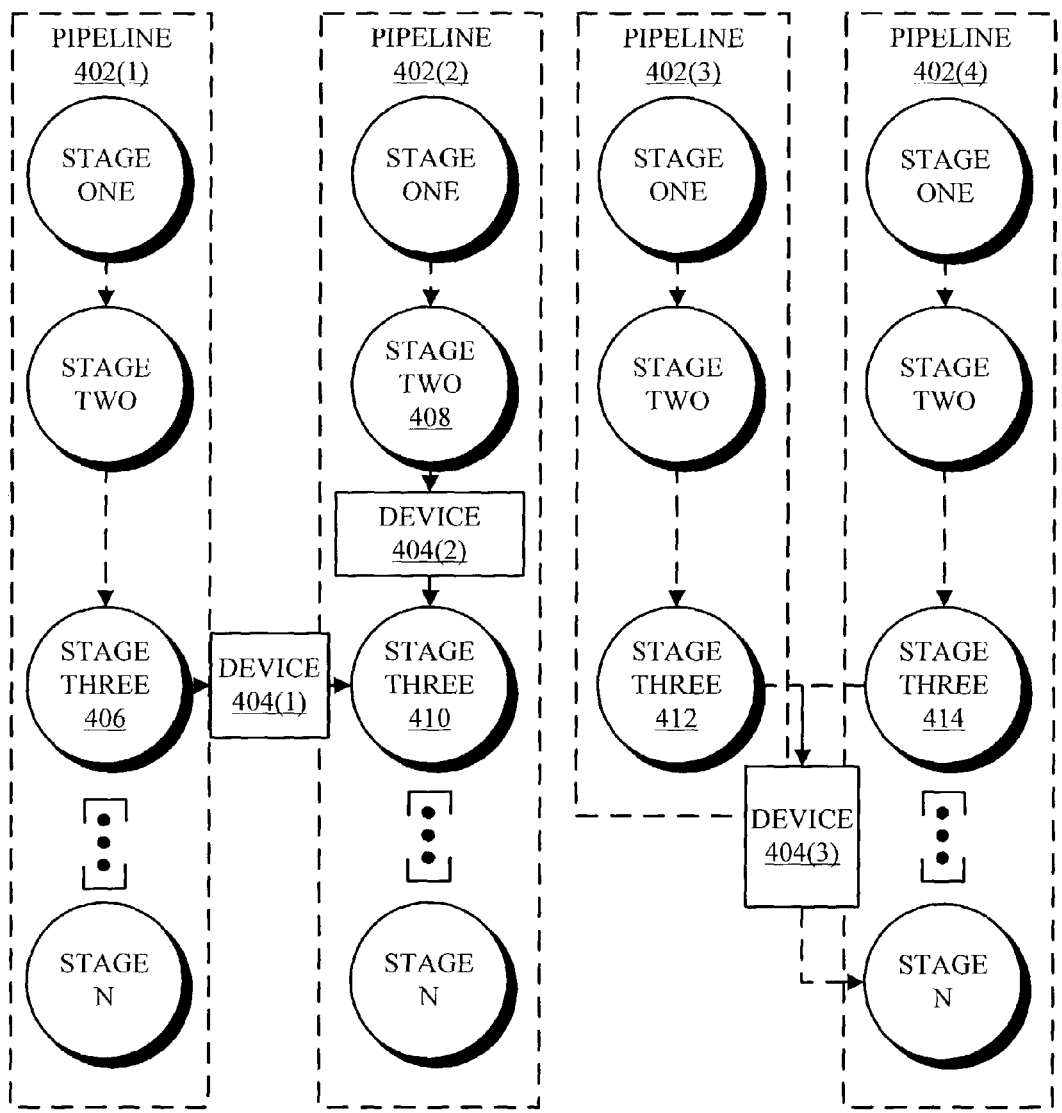
FIG. 4 is an illustration of an exemplary implementation in which multiple pipelines having a plurality of stages utilize data stores to provide asynchronous operation.

FIG. 4 is an illustration an exemplary implementation in which a system 400 of interconnected pipelines 402 includes a plurality of stages that utilize data stores to provide asynchronous operation of stages both with respect to other stages within the pipeline as well as to stages included in other pipelines. A plurality of pipelines 402 may be provided, such as a first pipeline 402(1), second pipeline 402(2), third pipeline 402(3) and fourth pipeline 402(4), each of which target specific types of data. The pipelines 402 are connected so that data from each of these pipelines 402 may be combined and/or propagated across other pipelines 402 to provide desired output.

Data stores may be provided in a variety of ways to provide asynchronous functionality of stages both within a pipeline and between pipelines. A data host may be implemented as a logical storage device, which may include one or more hardware data storage devices, such as RAM, storage media including hard disks and removable media, and the like. For example, a data host may include a first storage device 404(1) that receives output of a third stage 406 of the first pipeline 402(1) and a second storage device 404(2) configured to receive output of a second stage 408 of the second pipeline 402(2). Both the first and second storage devices 404(1), 404(2) may be accessed by a third stage 410 of the second pipeline 402(2) as a data host 110 (FIG. 3).

A single data storage device 404(3) may also be configured to receive data from multiple stages, such as a third stage 412 of the third pipeline 402(3) and a third stage 414 of the fourth pipeline 402(4). Although interconnection of exemplary data storage devices has been discussed, data storage devices may take a variety of configurations to implement a data host.

Additionally, a data host may include logic to provide additional functionality. The data host may use the logic to perform a variety of functions. For example, the data host may clone sets of data as described in relation to FIGS. 2 and 3, replace a set of data as described in relation to FIG. 5, aggregate sets of data as described in relation to FIG. 7, and the like.

During data processing, a situation may be encountered by the stage 104 in which data stored by the data host 110 is rendered obsolete, outdated, and the like. For instance, data may be provided in a stand-alone format which does not depend on previous versions of the data to be complete. Thus, data may be output by a stage which is an updated version of data stored in the data host. Therefore, to further improve efficiency of the pipeline 102, obsolete data may be replaced by updated data in the data host 110.

Figure 5:
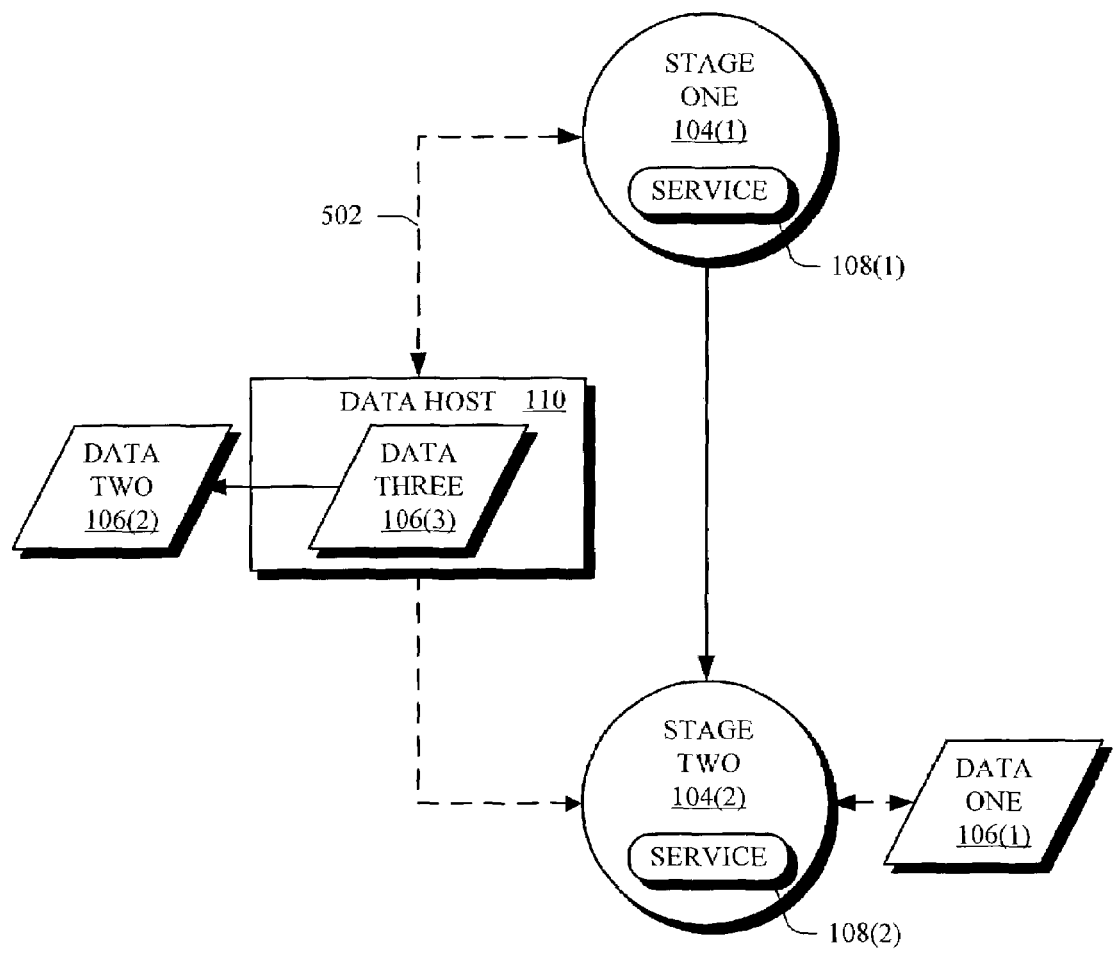
FIG. 5 is an illustration of an exemplary implementation in which a previous set of data is replaced with an updated set of data in the data host.

FIG. 5 is an illustration of the data host 110 in which a previous set of data is replaced with an updated set of data. Continuing from the previous example which was discussed in relation to FIG. 1, the second stage 104(2) is processing the first set of data 106(1) by executing the second service 108(2). The first stage 104(1) processes the second set of data 106(2) by executing the first service 108(1), which is then stored in the data host 110. Thus, the first service 108(1) may then process a third set of data 106(3).

The third set of data 106(3) is stored in the data host 110 after processing. However, the second service 108(2) may not be available to process the second set of data 106(3). For example the second service 108(2) may still be processing the first set of data 106(1). Additionally, a hardware error, software error, and/or network communication error may be encountered. Therefore, the second set of data 106(2) is still located in the data host 110. In this example, each set of data 106 is a "stand-alone" set of data, and therefore, the third set of data 106(3) may be used to replace the second set of data 106(2) in the data host 110. In this way, the second service 108(2) processes an up-to-date version of data and does not needlessly process "old" data, thereby further increasing timeliness and efficiency of the pipeline 102 (FIG. 1).

Replacing the second set of data 106(2) may be performed in a variety of ways. In one implementation, a bidirectional data pathway 502 is provided so that the first stage 104(1) may determine if a previously output second set of data 106(2) is stored in the data host 110. The first stage 104(1) may then replace the second set of data 106(2) as described. In another implementation, the replacement of the second set of data 106(2) is performed by the data host 110, itself. For example, the data host 110 may include logic to determine a most up-to-date version of sets of data which are stored in the data host 110. The data host 110 may replace an outdated set of data with a determined up-to-date version of the set of data.

In this example, the stages 104 do not track which version of the data is being processed, but rather, process a most current version of data available to the stage 104. Thus, control information utilized by the pipeline 102 is minimized, thereby further increasing efficiency. For example, the second service of the second stage 104(2) may process whatever set of data is available in the data host, because the set of data is the most current version, i.e. is the most "up-to-date." Control information may include information indicating data availability, where data is located, and the like. A further discussion of control information as version information may be found in the following discussion.

Figure 6:
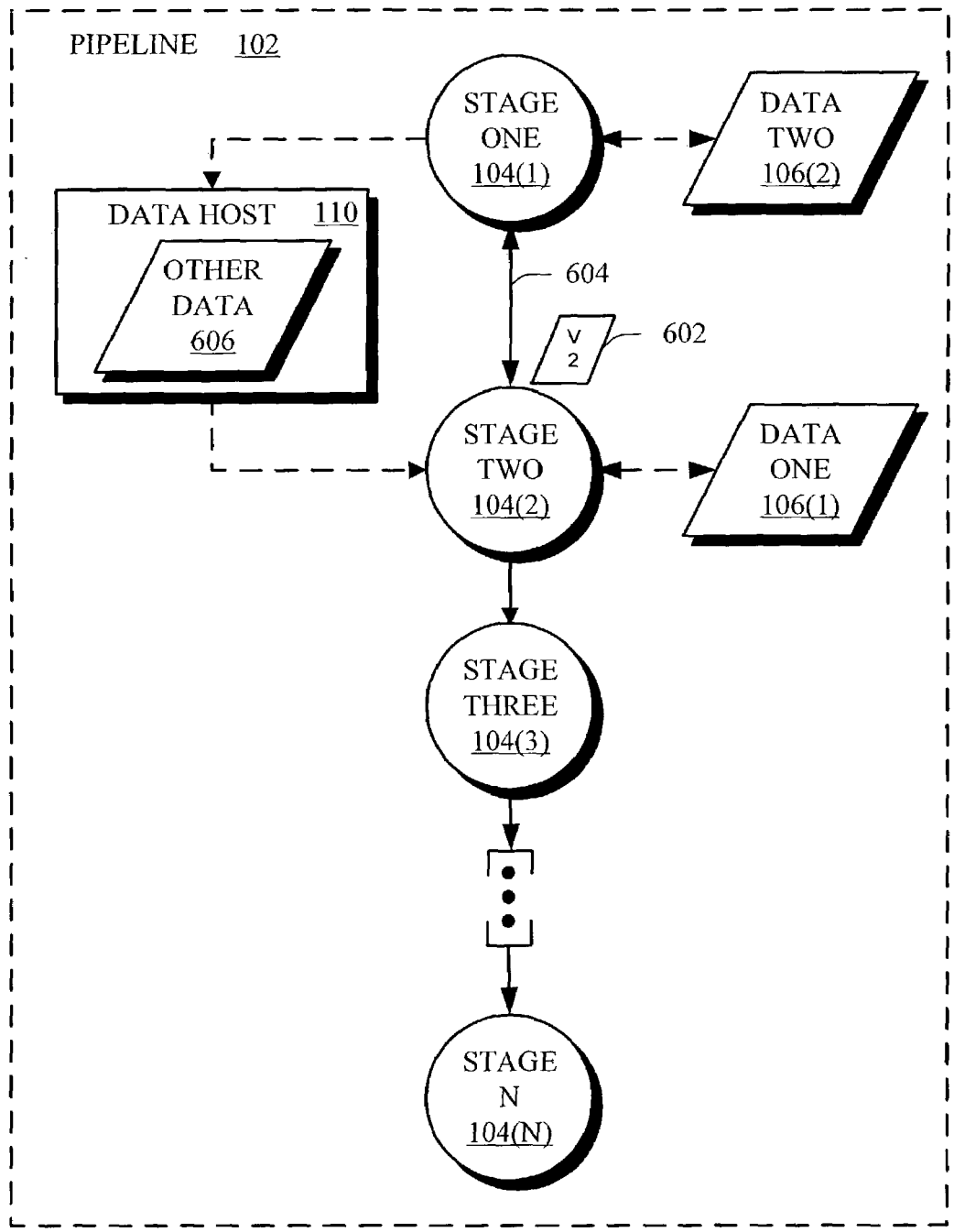
FIG. 6 is an illustration of an exemplary implementation in which incremental sets of data are processed through a pipeline, and version information is utilized in conjunction with the incremental sets of data.

FIG. 6 is an illustration of an exemplary implementation wherein incremental sets of data are processed through a pipeline 102. In the previous figure, stand-alone sets of data were utilized, and thus, an updated version of a set of data may safely replace an older version of the set of data. However, instances may be encountered in which sets of data received by a pipeline 102 increment previous sets of data. For example, statistics may be sent as a set of data which adds to a previously sent set of data, such as points scored in a period of play in a sporting event. Therefore, unprocessed sets of data cause erroneous results and negate the value of processed sets of data.

In such an instance, it is desirable to process each set of data. To ensure that each set of data is processed, version information 602 is provided. Version information 602 may be configured in a variety of ways, such as a time stamp, include information identifying a source of data, a counter, and the like. Version information has a variety of uses. For instance, version information 602 may be used to determine that each set of data is processed in a desired order, that each set of data is received, to identify a correct set of data in a data host, may be used to track data as it is transferred through each successive stage 104 of the pipeline 102, and the like.

Version information 602 is transferred as control information through a control pathway 604. The second stage 104(2) receives the version information 602, which is used to determine which set of data, stored in the data host 110, is to be processed. The version information 602 is used to identify a corresponding set of data, e.g. the second set of data 106(2), in the data host 110 from other sets of data 606. However, the second set of data 106(2) may be unavailable for communication to the second stage 104(2) because of an error. For example, the error may have occurred when transmitting the second set of data 106(2) to the data host 110, a hardware and/or software error that resulted in loss of the second set of data 106(2) from the data host 110, and the like. In the illustrated example, the version information 602 indicates that the second set of data 106(2) is to be processed, but the data host 110 contains the other set of data 606, instead.

The data host 110 may trigger a variety of actions by identifying that a set of data, corresponding to the version information 602, is not available. For example, an error message may be output, such as by a display on a display device, email, and the like, that indicates that the second set of data 106(2) is missing. Additionally, the second stage 104(2) may request that the first stage 104(1) resend the second set of data 106(2). For example, the control pathway 604 between the first stage 104(1) and the second stage 104(2) may be bidirectional so that the second stage 104(2) may communicate with the first stage 104(1).

Figure 7:
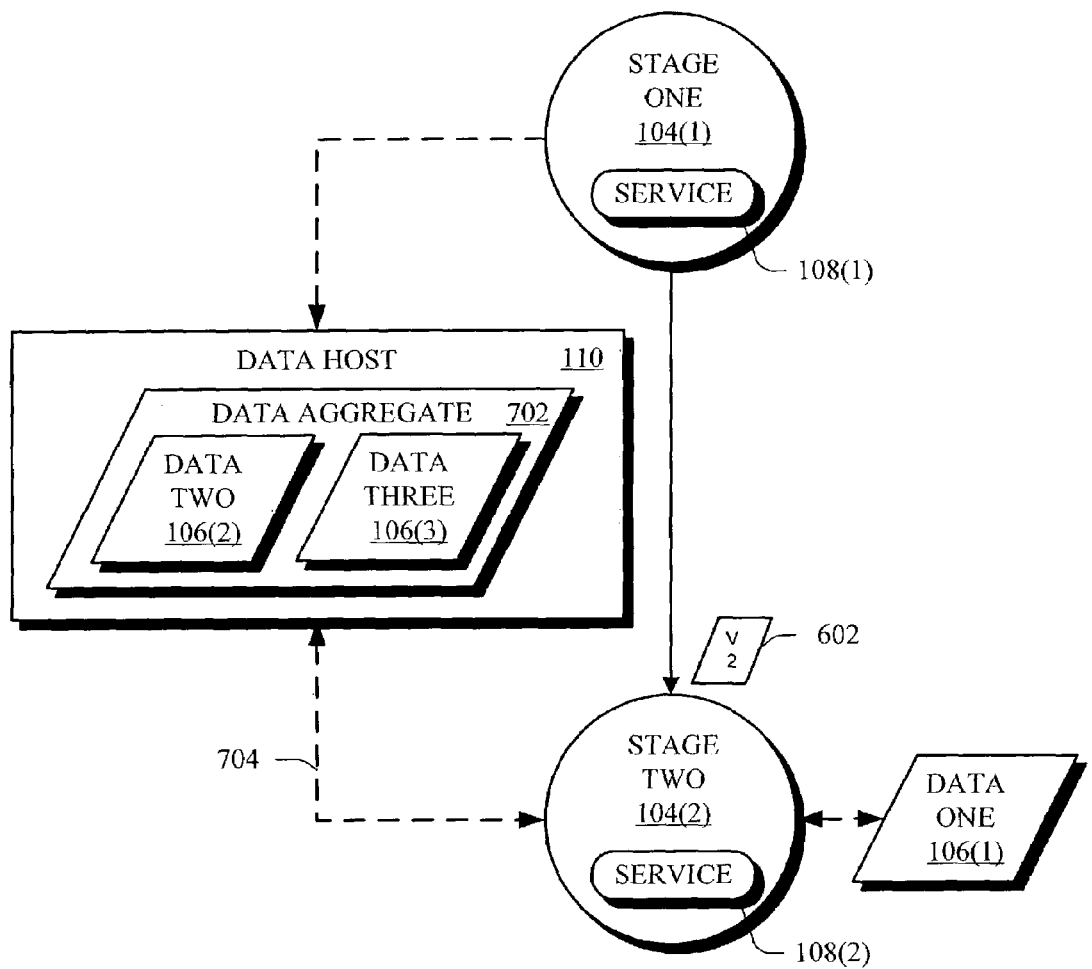
FIG. 7 is an illustration of an exemplary implementation in which data is aggregated for being communicated to stages of the pipeline.

FIG. 7 is an illustration of an exemplary implementation wherein data is aggregated for processing by stages 104 of a pipeline 102. Sets of data may be aggregated for transfer between stages to more efficiently communicate and process data. For instance, the data host 110 may receive sets of data at a rate that is much greater than the rate at which a subsequent stage, i.e. the second service 108(2), may execute data processing services. Sets of data may be aggregated into a data aggregate 702 for transfer and processing by stages 104 of the pipeline 102 to improve efficiency of data communication and control information. For example, the data aggregate may reduce the number of the sets of data to be tracked, may reduce the likelihood of lost sets of data, and the like, The data host 110 is configured for data aggregation of received sets of data. In this instance, the first stage 104(1) outputs incremental sets of data at a rate greater than a rate at which the second service 108(2) may process the sets of data. The data host 110 includes an aggregation function which enables the incremental sets of data to be aggregated for transfer to subsequent stages. For example, when the second service 108(2) is processing the first set of data 106(1), the third set of data 106(3) is aggregated with the second set of data 106(2) into the data aggregate 702 by the data host 110. The data host 110 may determine whether the second service 108(2) is available to process data by using a bidirectional data pathway 704. The data host 110 may also determine that the second stage 104(2) is ready to receive the data aggregate 702, and transfer the data aggregate 702 to the second stage 104(2) for processing by the second service 108(2).

The data aggregate 702 is passed between stages 104 without requiring separate sets of control information, such as version information 602, to be passed with each set of data separately, e.g. the second and third sets of data 104(2), 104(3). For example, the second stage 104(2) may obtain the data aggregate 702 from the data host 110 and view the data aggregate 702 as a single set of data, even though the data aggregate 702 includes the second set of data 106(2) and the third set of data 106(3). Additionally, the second stage 104(2) may use a single instance of control information, such as version information 602, to identify the data aggregate 702. In this way, the second stage 104(2) does not need to receive separate sets of version information 602 for the second and third sets of data 106(2), 106(3) included in the data aggregate 702. The data aggregate 702 may take a variety of forms, such as an aggregate of sets of data that is transferred in a single communication operation from the data host 110 to the second stage 104(2), an aggregate of sets of data reformatted as a single set of data using a single instance of version information 602, and the like.

Exemplary Processes

Figure 8:
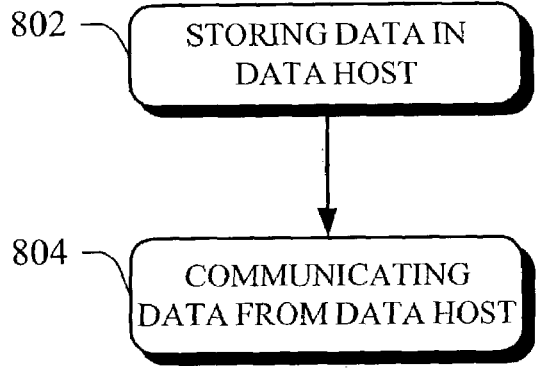
FIG. 8 is a flow diagram depicting an exemplary procedure in which the data host provides asynchronous operation of stages communicatively coupled to the data host.

FIG. 8 is a flow diagram illustrating an exemplary process 800 in which stages 104, communicatively coupled to the data host 110, asynchronously interact with the data host 110, one to another. At block 802, data output by the first stage 104(1) of the pipeline 102 is stored in the data host 110. Data may be stored by receiving data from the first stage 104(1) and writing data to a data storage device of the data host 110 as described in relation to FIG. 4. Additionally, data may by retrieved from the first stage 104(1) by the data host 110. For instance, the data host 110 may access the first stage 104(1) and read data contained therein.

At block 804, data is communicated from the data host 110 to the second stage 104(2). Data may be communicated in a variety of ways. For example, data may be received by the data host 110 and written to a locally accessible data storage device that is accessed by the second stage 104(2), such as RAM, a hard disk drive, and the like. Additionally, the second stage 104(2) may retrieve data from the data host 110 as described previously.

The data host 110 enables data to be asynchronously stored and communicated by the first stage 104(1) and the second stage 104(2), respectively. Thus, the first and second stages 104(1), 104(2) may interact with the data host 110 without interfering with each other.

Figure 9:
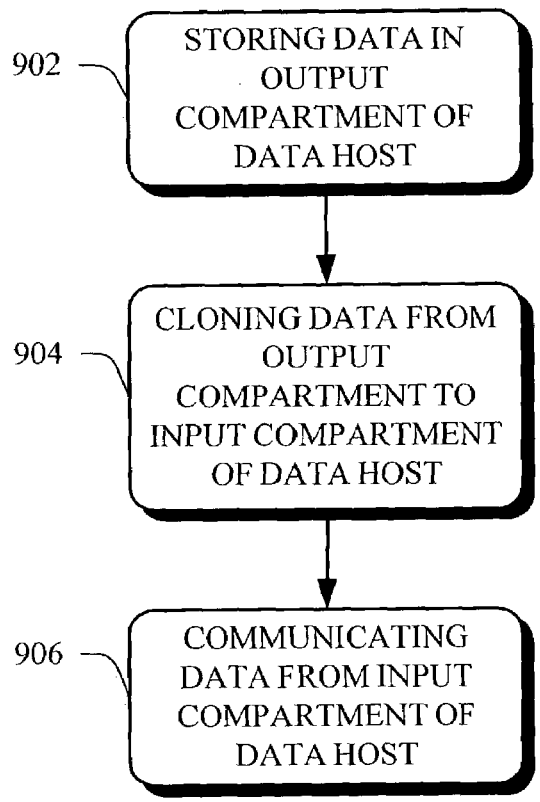
FIG. 9 is a flow diagram depicting an exemplary procedure in which data is cloned in a data host to provide asynchronous operation.

FIG. 9 is a flow diagram depicting an exemplary process 900 wherein data is cloned in a data host 110 to provide asynchronous operation. The data host 110 may include an output compartment 202 for receiving data output by a previous stage, such as the first stage 104(1). The data host 110 may also include an input compartment 204 which serves to provide data for input by a subsequent stage, i.e. the second stage 104(2). The output compartment 202 and the input compartment 204 enable stages communicatively coupled to the data host 110 to asynchronously interact with the data host 110, one to another.

At block 902, data is stored in the output compartment 202 of the data host 110. The stored data is cloned from the output compartment 202 to the input compartment 204 of the data host 110 (block 904). Cloning may be performed in a variety of ways. For example, cloning may include copying data from a first data storage device implementing the output compartment 202 to a second data storage device implementing the input compartment 204. Additionally, cloning may include copying data between a first partition of a data storage device implementing the output compartment 202 to a second partition of the data storage device implementing the input compartment 204.

At block 906, the cloned data is communicated from the input compartment 204 of the data host 110 to the second stage 104(2). As before, the cloned data may be communicated by retrieving the cloned data from the data host 110, receiving the cloned data which is transmitted from the data host 110, and the like.

Figure 10:
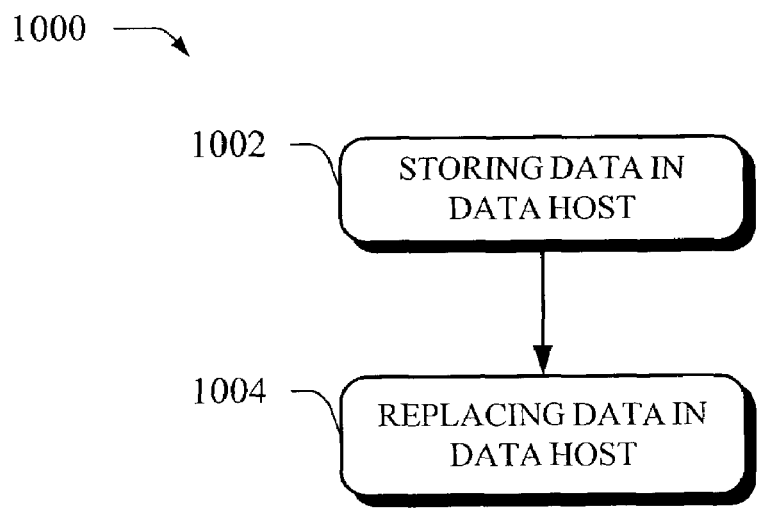
FIG. 10 is a flow diagram depicting an exemplary procedure in which an updated set of data is used to replace a previous set of data that was stored in the data host.

FIG. 10 is a flow diagram of an exemplary process 1000 in which an updated set of data is used to replace a previous set of data in the data host 110. Stand-alone sets of data may be processed by the pipeline 102 in which the set of data does not depend on previous and/or subsequent sets of data. If multiple versions of these sets of data are stored in a data host, an updated version may be used to replace a previous version, so that, the pipeline 102 (FIG. 1) provides a most up-to-date version of data in a shortest amount of time. For example, at block 1002, a stand-alone set of data which was output by the first stage 104(1) is stored in the data host 110. The first stage 104(1) then processes a subsequent stand-alone set of data by executing the first service 108(1).

At block 1004, the stored set of data is replaced by the subsequent set of data in the data host 110. Thus, when the second service 108(2) of the second stage 104(2) is processing a previous set of data output by the first stage 104(1), the stored set of data may be replaced. When the second service of the second stage 104(2) has completed processing the previous set of data, the subsequent set of data may be communicated to the second stage 104(2).

Figure 11:
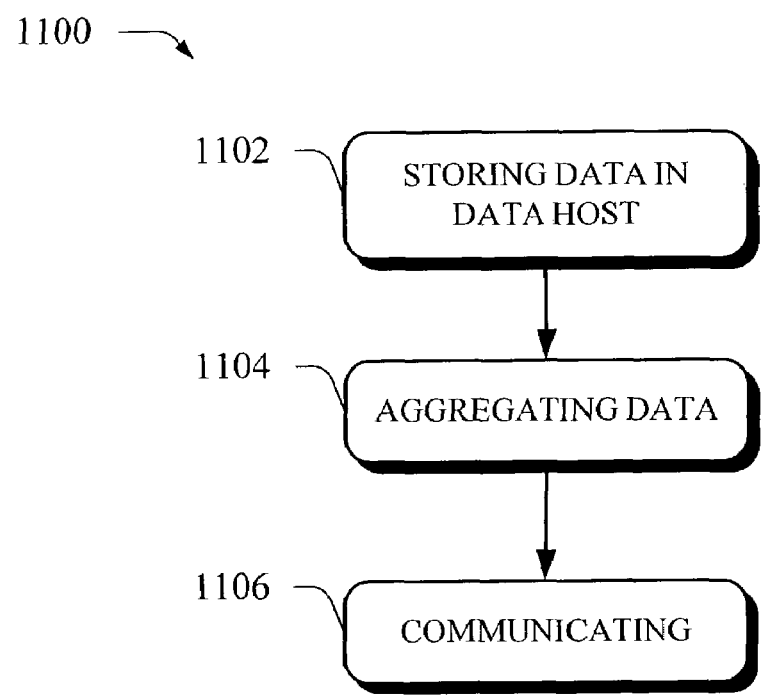
FIG. 11 is a flow diagram depicting an exemplary procedure in which sets of data are aggregated into a data aggregate.

FIG. 11 is a flow diagram of an exemplary process 1100 in which sets of data are aggregated into a data aggregate 702. Sets of data may be encountered in which it is desirable to process each set of data. To improve efficiency of the pipeline 102, sets of data are aggregated while a service of a subsequent stage is unavailable to process data so that data may be efficiently transferred between stages 104. At block 1102, the first set of data 106(1), which was output by the first stage 104(1), is stored in the data host 110. The first service 108(1) of the first stage 104(1) then begins processing the second set of data 106(2). The second service 108(2) of the second stage 104(2) is processing the third set of data 106(3) which was output by the first stage 104(1) before the first set of data 106(1).

At block 1104, while the second service 108(2) is processing the third set of data 106(3), the first set of data 106(1) and the second set of data 106(2) are aggregated into a data aggregate 702. Once the second service 108(2) has completed processing the third set of data 106(3), the data aggregate 702 is communicated to the second stage 104(2) from the data host 110 (block 1106). The data aggregate 702 may be communicated by receiving the data aggregate 702, retrieving the data aggregate 702, and the like.

Figure 12:
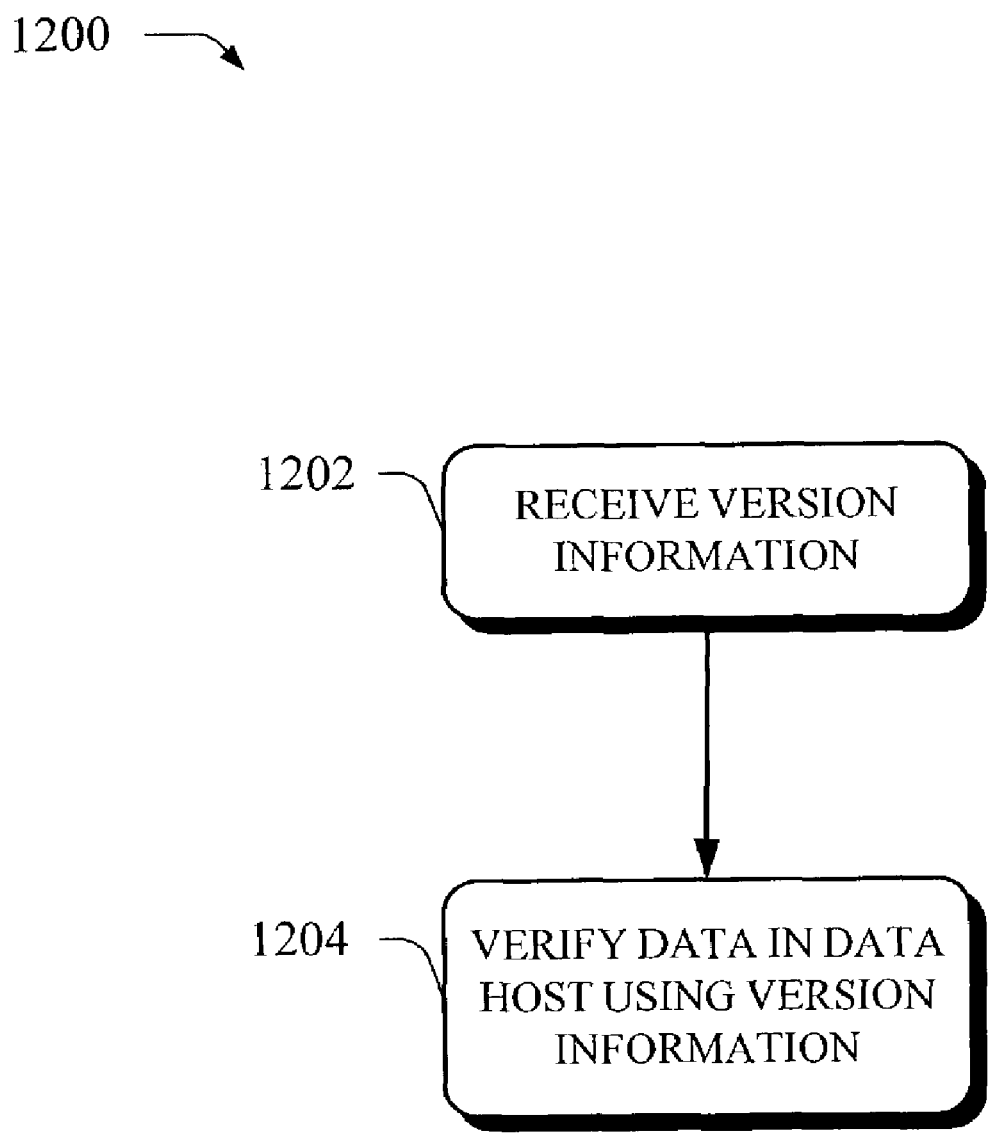
FIG. 12 is a flow diagram depicting an exemplary procedure in which version information is used to verify a version of data stored in the data host.

FIG. 12 is a flow diagram illustrating an exemplary process 1200 in which version information is used to verify a version of data stored in the data host 110. Version information 602 may be used to track sets of data through the pipeline 102 to ensure that all the sets of data are processed, that the sets of data are processed in a correct order, and the like. At block 1202, version information 602 is received by the second stage 104(2) of the pipeline 102. The version information 602 is provided by the first stage 104(1) through a control pathway 110.

At block 1204, the second stage 104(2) verifies a version of a set of data stored in the data host 110 by using the version information 602. For example, the second stage 104(2) may locate a particular set of data for processing, as indicated by the version information 602, from a plurality of sets of data stored in the data host 110. This may be used to process sets of data in a desired order. Additionally, the second stage 104(2) may verify that a version of data is available from the data host 110. Thus, the second stage 104(2) may determine if an error occurred in transferring data, storing data, and the like.

Exemplary Operating Environment

Figure 13:
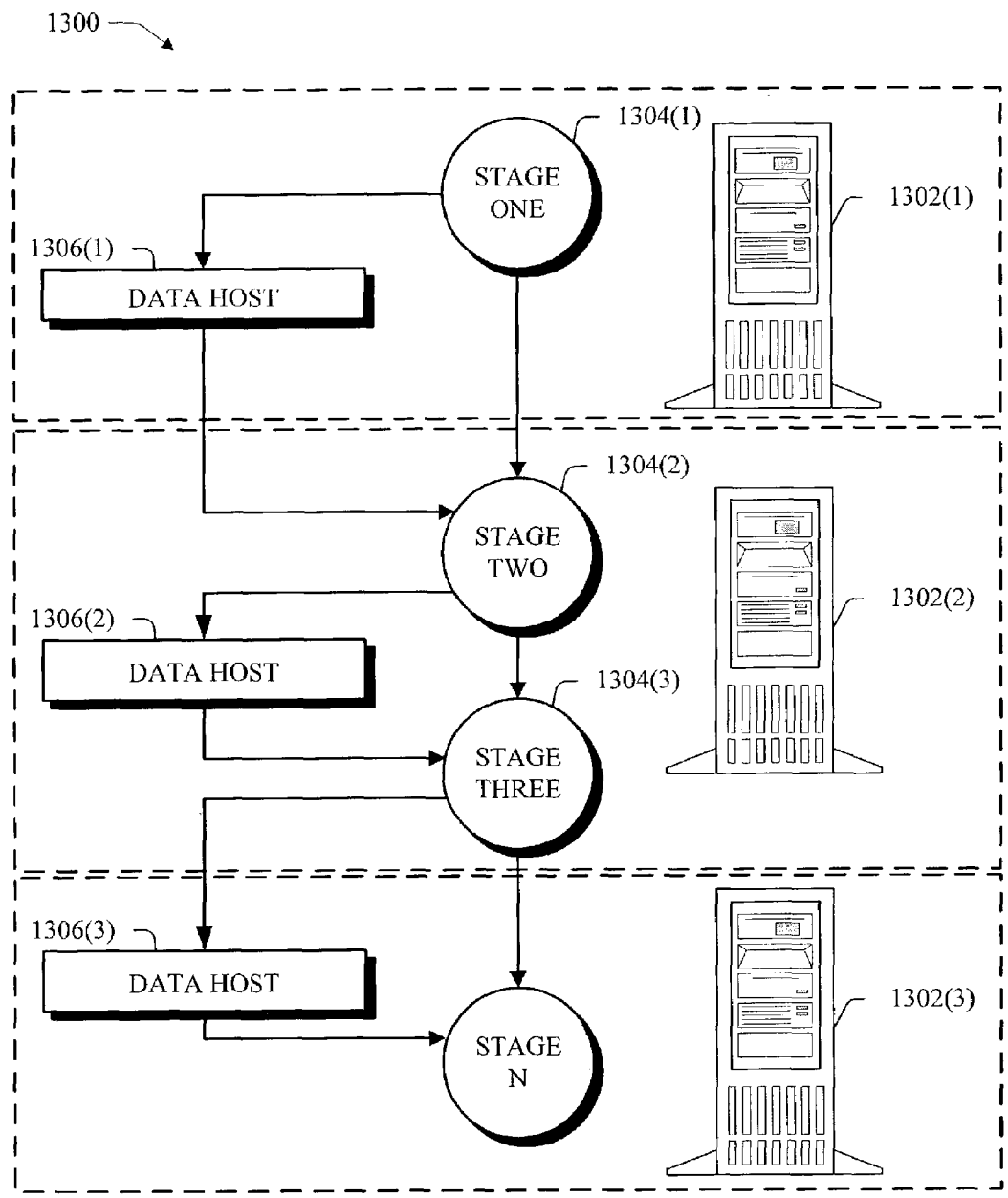
FIG. 13 is an illustration of an exemplary system operable to embody the present invention.

FIG. 13 is an illustration of an exemplary implementation wherein a system is configured for implementing a pipeline 1300. Systems implementing pipelines may be configured in a variety of ways. For instance, considerations such as processing power, network connections, type of data, destination for data, and the like, may be addressed to provide a system of pipelines which correspond to a developer's needs.

As shown in FIG. 13, a system implementing a pipeline 1300 may include multiple computers 1302(1), 1302(2), 1302(3) implementing first, second and third stages 1304(1), 1304(2), 1304(3) and data stores 1306(1), 1306(2), 1306(3). A first stage 1304(1), and a first data host 1306(1) communicatively coupled to the first stage 1304(1), are implemented on a first computer 1302(1). The first computer 1302(1) is communicatively coupled to a second computer 1302(2) which operates to host a second stage 1304(2), a third stage 1304(3), and a second data host 1306(2). The second stage 1304(2), implemented on the second computer 1302(2), may access the first data host 1306(1) implemented on the first computer 706(1), which receives the output of the first stage 1304(1). Likewise, the third stage 1306(3) transfers its output to a third data host 1306(3) implemented on a third computer 1302(3).

Figure 14:
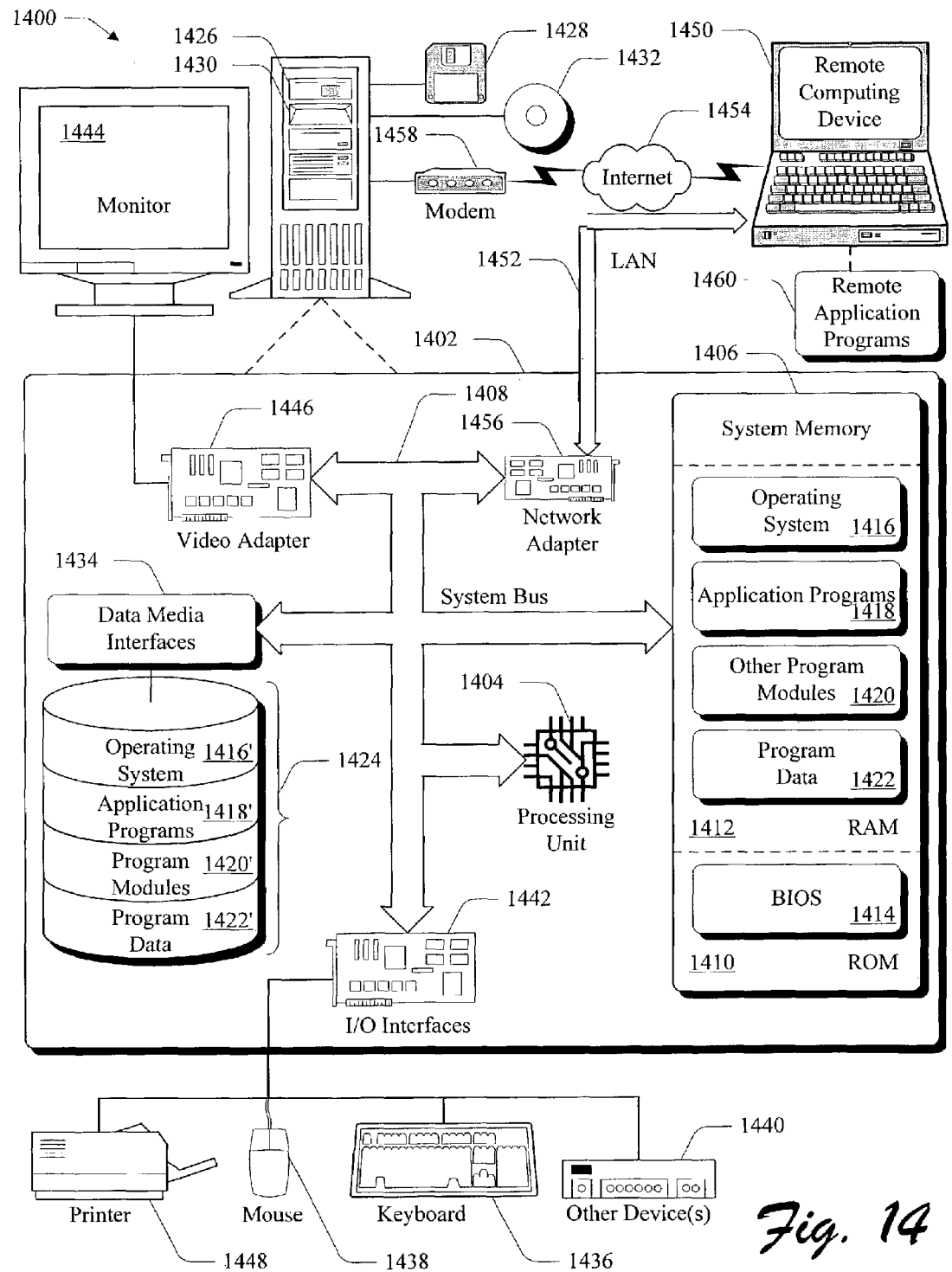
FIG. 14 illustrates components of an example of a computer environment, including a computer.

The various components and functionality described herein are implemented with a number of individual computers. FIG. 14 shows components of a typical example of a computer environment 1400, including a computer, referred by to reference numeral 1402. The components shown in FIG. 14 are only examples, and are not intended to suggest any limitation as to the scope of the functionality of the invention; the invention is not necessarily dependent on the features shown in FIG. 14.

Generally, various different general purpose or special purpose computing system configurations can be used. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 14, the components of computer 1402 may include, but are not limited to, a processing unit 1404, a system memory 1406, and a system bus 1408 that couples various system components including the system memory to the processing unit 1404. The system bus 1408 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 1402 typically includes a variety of computer-readable media. Computer-readable media can be any available media that can be accessed by computer 1402 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1402. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 1406 includes computer storage media in the form of volatile and/or nonvolatile memory such as read only memory (ROM) 1410 and random access memory (RAM) 1412. A basic input/output system 1414 (BIOS), containing the basic routines that help to transfer information between elements within computer 1402, such as during start-up, is typically stored in ROM 1410. RAM 1412 typically contains data and/or program modules that are immediately accessible to and/or presently being operated on by processing unit 1404. By way of example, and not limitation, FIG. 14 illustrates operating system 1416, application programs 1418, other program modules 1420, and program data 1422.

The computer 1402 may also include other removable/non-removable, volatile/nonvolatile computer storage media. By way of example only, FIG. 14 illustrates a hard disk drive 1424 that reads from or writes to non-removable, nonvolatile magnetic media, a magnetic disk drive 1426 that reads from or writes to a removable, nonvolatile magnetic disk 1428, and an optical disk drive 1430 that reads from or writes to a removable, nonvolatile optical disk 1432 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1424 is typically connected to the system bus 1408 through a non-removable memory interface such as data media interface 1434, and magnetic disk drive 1426 and optical disk drive 1430 are typically connected to the system bus 1408 by a removable memory interface.

The drives and their associated computer storage media discussed above and illustrated in FIG. 14 provide storage of computer-readable instructions, data structures, program modules, and other data for computer 1402. In FIG. 14, for example, hard disk drive 1424 is illustrated as storing operating system 1416', application programs 1418', other program modules 1420', and program data 1422'. Note that these components can either be the same as or different from operating system 1416, application programs 1418, other program modules 1420, and program data 1422. Operating system 1416', application programs 1418', other program modules 1420', and program data 1422' are given different numbers here to illustrate that, at a minimum, they are different copies.

A user may enter commands and information into the computer 1402 through input devices such as a keyboard 1436 and pointing device 1438, commonly referred to as a mouse, trackball, or touch pad. Other input devices (not shown) may include a microphone, joystick, game pad, satellite dish, scanner, or the like. These and other input devices 1440 are often connected to the processing unit 1402 through an input/output (I/O) interface 1442 that is coupled to the system bus, but may be connected by other interface and bus structures, such as a parallel port, game port, or a universal serial bus (USB). A monitor 1444 or other type of display device is also connected to the system bus 1408 via an interface, such as a video adapter 1446. In addition to the monitor 1444, computers may also include other peripheral output devices (e.g., speakers) and one or more printers 1448, which may be connected through the I/O interface 1442.

The computer may operate in a networked environment using logical connections to one or more remote computers, such as a remote computing device 1450. The remote computing device 1450 may be a personal computer, a server, a router, a network PC, a peer device or other common network node, and typically includes many or all of the elements described above relative to computer 1402. The logical connections depicted in FIG. 14 include a local area network (LAN) 1452 and a wide area network (WAN) 1454. Although the WAN 1454 shown in FIG. 14 is the Internet, the WAN 1454 may also include other networks. Such networking environments are commonplace in offices, enterprise-wide computer networks, intranets, and the like.

When used in a LAN networking environment, the computer 1402 is connected to the LAN 1452 through a network interface or adapter 1456. When used in a WAN networking environment, the computer 1402 typically includes a modem 1458 or other means for establishing communications over the Internet 1454. The modem 1458, which may be internal or external, may be connected to the system bus 1408 via the I/O interface 1442, or other appropriate mechanism. In a networked environment, program modules depicted relative to the computer 1402, or portions thereof, may be stored in the remote computing device 1450. By way of example, and not limitation, FIG. 14 illustrates remote application programs 1460 as residing on remote computing device 1450. It will be appreciated that the network connections shown are exemplary and other means of establishing a communications link between the computers may be used.

The application programs 1418 may include stages and data processing services to be executed by the processing unit 1404 to provide data processing. In an additional implementation, the application programs 1418 may include a stage having a service executed by the processing unit 1404, which is communicatively coupled using a network adapter 1456 to a remote computing device 1450, which is implementing an additional stage using the remote application programs 1460. The application programs 1418 may also provide logic for implementation of a data host 110, which uses the hard disk drive 1424, system memory 1406, and the like, for storing data.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A pipeline implemented by one or more computers, the pipeline comprising:
    a first stage for executing a first data processing service to output a first set of data and a second set of data;
    a second stage for executing a second data processing service; and
    a data host having a size based on an amount of time that the second stage executes the second data processing service and an amount of time that the first stage executes the first data processing service, communicatively coupled to the first and second stages for:
        storing the first set of data such that the executing of the first data processing service is asynchronous with respect to the executing of the second data processing service; and
        communicating the second set of data to the second stage, wherein the storing and the communicating are asynchronous, one to another.

2. A pipeline as described in claim 1, wherein:
    the data host is communicatively coupled to communicate data to the first and second stages by using, respectively, a first data pathway and a second data pathway; and
    the first stage is communicatively coupled for communicating instructions to the second stage by using a control pathway.

3. A pipeline as described in claim 2, wherein the use of at least one of the first data pathway, the second data pathway, and the control pathway is a bidirectional use.

4. A pipeline as described in claim 1, wherein the communicating further comprises sending a transmission including the second set of data from the data host at the second stage.

5. A pipeline as described in claim 1, further comprising a third stage communicatively coupled to the second stage, wherein the third stage is configured for direct communication of sets of data from the second stage without using a data host.

6. A pipeline as described in claim 1, wherein the data host provides for the storing and the communicating to be performed simultaneously.

7. A method comprising:
    in a pipeline, implemented by one or more computers, including a first stage for executing a first data processing service to output a first set of data, a second stage for executing a second data processing service, and a data host communicatively coupled to the first stage and the second stage,
    storing the first set of data in the data host having a size based on an amount of time that the second stage executes the second data processing service and an amount of time that the first stage executes the first data processing service, wherein the execution of the first data processing service is asynchronous with respect to the execution of the second data processing service; and
    communicating a second set of data from the data host to the second stage,
    wherein the storing and the communicating are performed asynchronously, one to another.

8. A method as described in claim 7, wherein the storing and communicating are performed simultaneously.

9. A method as described in claim 7, wherein the communicating is selected from the group consisting of the following:
    receiving the second set of data by the second stage from the data host; and
    retrieving the second set of data from the data host by the second stage.

10. One or more computer-readable media comprising computer-executable instructions that, when executed, perform the method as recited in claim 7.

11. One or more computer-readable storage media comprising instructions that, if executed in a pipeline including a first stage for executing a first data processing service to output a first set of data, a second stage for executing a second data processing service, and a data host communicatively coupled to the first stage and the second stage, cause the pipeline to perform a method comprising:

storing the first set of data in the data host having a size based on an amount of time that the second stage executes the second data processing service and an amount of time that the first stage executes the first data processing service, wherein the execution of the first data processing service is asynchronous with respect to the execution of the second data processing service; and communicating a second set of data from the data host to the second stage, wherein the storing and the communicating are performed asynchronously, one to another.

12. One or more computer-readable storage media as described in claim 11, wherein the storing and communicating are performed simultaneously.

13. One or more computer-readable storage media as described in claim 11, wherein the communicating is selected from the group consisting of the following:

receiving the second set of data by the second stage from the data host; and retrieving the second set of data from the data host by the second stage.

\* \* \* \* \*